(12) United States Patent
Fuderer et al.

(10) Patent No.: US 8,251,187 B2
(45) Date of Patent: Aug. 28, 2012

(54) PNEUMATIC BRAKE DEVICE

(75) Inventors: Erich Fuderer, Furstenfeldbruck (DE);
Andre Stegmann, Eichenau (DE)

(73) Assignee: Knorr-Bremse Systeme fur Schienenfahrzeuge GmbH, Munich (DE)

( * ) Notice: Subject to any disclaimer, the term of this patent is extended or adjusted under 35 U.S.C. 154(b) by 69 days.

(21) Appl. No.: 13/060,875

(22) PCT Filed: Sep. 2, 2009

(86) PCT No.: PCT/EP2009/006341
§ 371 (c)(1),
(2), (4) Date: Feb. 25, 2011

(87) PCT Pub. No.: WO2010/025893
PCT Pub. Date: Mar. 11, 2010

(65) Prior Publication Data
US 2011/0147145 A1 Jun. 23, 2011

(30) Foreign Application Priority Data
Sep. 4, 2008 (DE) .................... 10 2008 045 711

(51) Int. Cl.
*B60T 11/10* (2006.01)
(52) U.S. Cl. ............. 188/52; 188/219.1; 188/222.6; 188/226.1
(58) Field of Classification Search ............ 188/33, 188/52, 107, 219.1, 222.6, 226.1, 228.1; 105/26.05, 27, 199.1
See application file for complete search history.

(56) References Cited

U.S. PATENT DOCUMENTS

| 6,431,329 | B1 | 8/2002 | Huber, Jr. et al. |
| 6,443,270 | B1 | 9/2002 | Hodge |
| 6,722,477 | B1 * | 4/2004 | Wolfsteiner et al. .......... 188/72.9 |
| 7,011,190 | B2 * | 3/2006 | Moriarity et al. .............. 188/33 |
| 7,165,659 | B2 * | 1/2007 | Staltmeir et al. .............. 188/52 |
| 7,261,189 | B2 * | 8/2007 | Kerscher et al. ............. 188/72.7 |

FOREIGN PATENT DOCUMENTS

| DE | 396489 | 6/1924 |
| DE | 103 04 715 | 8/2004 |
| DE | 103 04 716 | 8/2004 |
| WO | 2006/050770 | 3/2006 |

OTHER PUBLICATIONS

International Search Report for International Application No. PCT/EP2009/006341, dated Feb. 5, 2010.
Transmittal of International Preliminary Report on Patentability for International Application No. PCT/EP2009/006341 and Written Opinion.
English Translation of the International Preliminary Report on Patentability for International Application No. PCT/EP2009/006341 and Written Opinion.

* cited by examiner

*Primary Examiner* — Christopher Schwartz
(74) *Attorney, Agent, or Firm* — Barnes & Thornburg LLP

(57) ABSTRACT

The invention relates to a pneumatic brake device having a spindle movable in the axial direction and a yoke, on which the spindle is supported such that a rotation of the spindle is prevented. According to the invention, a first and a second yoke toothed ring having sets of teeth (8; 10) directed toward each other are connected to the yoke in a rotationally fixed manner. Furthermore, a spindle toothed ring with sets of teeth on both sides is rigidly connected to the spindle between the two yoke toothed rings.

12 Claims, 3 Drawing Sheets

PNEUMATIC BRAKE DEVICE

CROSS-REFERENCE TO RELATED APPLICATIONS

The present application claims the benefit of priority to International Patent Application No. PCT/EP2009/006341 filed 2 Sep. 2009, which further claims the benefit of International Patent Application No. 10 2008 045 711.6 filed 4 Sep. 2008, the contents of which are incorporated herein by reference in their entirety.

BACKGROUND

The invention relates to a pneumatic brake device.

Such brake devices are used on rail vehicles and elsewhere, where they are often used to actuate a brake beam, which serves for pressing brake blocks against the wheel tires. Such brake devices are fitted, in particular, in the bogies of freight wagons. In order to be able to compensate for the wearing of the brake blocks and the wheel tires, an adjusting device having a spindle and an adjusting nut is usually provided. During the adjustment process a rotation of the adjusting nut is allowed, whilst the spindle remains rotationally fixed. Attachment to the brake beam is generally carried out by way of an actuator, in which the free end of the spindle terminates. Such brake devices are described in DE 103 04 715 A1 and DE 103 04 716 A1, for example.

During the normal braking process a torque acts on the spindle. This torque must not lead to any turning of the spindle, however, since this would result in an unwanted adjustment effect. The spindle, therefore, usually comprises a spindle toothed ring, which is rotationally fixed to the spindle. A yoke toothed ring is likewise rotationally fixed to the yoke of the brake device. The two toothing systems are pre-tensioned towards one another by a compression spring, so that they intermesh. During the braking process the spindle toothed ring is pressed with great force against the yoke toothed ring, so that the torque acting on the spindle can be braced and introduced into the yoke.

If the adjusting device has to be returned to its original state after changing the brake blocks, this can be achieved by deliberately turning the spindle. In so doing the two toothed rings are ratcheted against the spring force.

It has now been recognized that the toothed rings only remain in engagement if pressure is exerted on the spindle during the braking process and the spindle is moved back into its rest position after the braking process. The situation is altogether different, however, if the brake blocks have become tightly frozen to the wheels, for example, or the retaining shackles, on which the brake device is suspended, have seized up due to corrosion, for example. When moving the spindle back, a greater tensile force then occurs, which the yoke connected to the brake blocks cannot follow. As a result the toothed rings are drawn apart against the force of the compression spring. In this state the spindle may yield to the torque acting on it. The turning of the spindle results in an unintended adjustment process.

In order to prevent this, a spring-loaded pawl, which reliably prevents the toothed rings being drawn apart, may be used. This pawl is fitted to the yoke and engages in a readjustment hexagon, rotationally fixed to the spindle. If the spindle now has to be turned back into its original position by way of the readjustment hexagon after changing the brake blocks, the pawl has to be kept disengaged with one hand, leaving only the other hand free for the screwing operation. Problems of corrosion can also occur with this design, thereby preventing an easy lifting of the pawl from its locking position.

SUMMARY

Disclosed embodiments provide a pneumatic brake device wherein, even under tensile action, an unintended adjustment of the brake device may be reliably prevented. Furthermore, both hands may be free for turning back the spindle. Additionally, embodiments avoid the risk of any malfunction occurring due to corrosion.

According to at least one embodiment, a pneumatic brake device is provided wherein, a first yoke toothed ring and second yoke toothed ring having opposing toothing systems are rotationally fixed to the yoke. A spindle toothed ring having a bilateral toothing system may be firmly connected to the spindle between the two yoke toothed rings. The spindle toothed ring may be thereby secured on both sides. Under a compressive load, such as that which occurs during the normal braking process, the spindle toothed ring may be pressed with great force onto the first yoke toothed ring. The torque acting on the spindle can thereby be introduced into the yoke via the first yoke toothed ring. Under a tensile load, such as that which occurs when the brake blocks have become frozen tight to the wheel tires, for example, the spindle toothed ring may be pressed against the second yoke toothed ring. In this case, too, the torque acting on the spindle may be reliably introduced into the yoke.

The second yoke toothed ring may be connected to the yoke in such a way that it may be axially displaceable. This facility for displacement ensures that when the spindle may be turned back, after changing the brake blocks, the toothed rings can separate from one another to such a degree that the spindle toothed ring can be rotated in opposition to the yoke toothed ring seated, rotationally fixed, in the yoke.

BRIEF DESCRIPTION OF THE FIGURES

Further details and advantages of the invention are set forth in the description of an exemplary embodiment, which will be explained in detail with reference to the drawing, in which.

DETAILED DESCRIPTION

Figure 1:
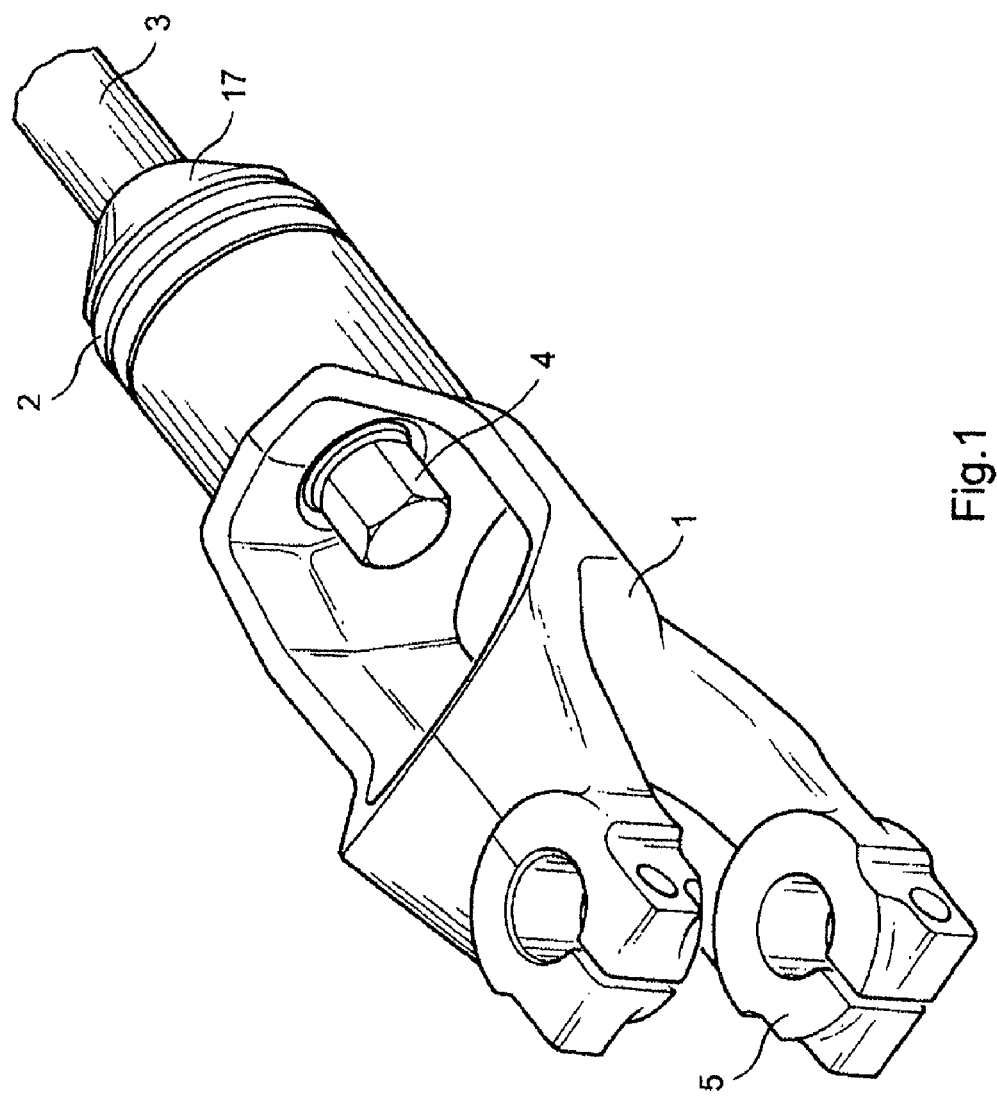
FIG. 1 shows a view of the actuator of a pneumatic brake device according to the invention.

Only the actuator with the parts of the inventive brake device essential for the invention are explained in the drawing. Cylinder, piston, adjusting device, brake beam, brake blocks, suspension shackles, parking device etc are shown and described in detail in DE 103 04 715 A1 and DE 103 04 716 A1.

FIG. 1 shows the actuator of the pneumatic brake device according to the invention in the final fitted state. At its one end the yoke 1 may be widened in the manner of tongs and may be provided with two fastening sleeves 5. These fastening sleeves 5 serve for the connection to a brake beam, to which the brake shoes with brake blocks are fitted. At the opposite end of the yoke 1 may be the fitting aperture 18 with the closure cap 2. The sealing collar 17 may be in turn fitted to the closure cap 2. The sealing collar 17 lies around the spindle 3 and thus seals off the internal space of the yoke 1 from the outside. The readjustment hexagon 4 can be seen protruding from the internal space in the middle of the yoke.

Figure 2:
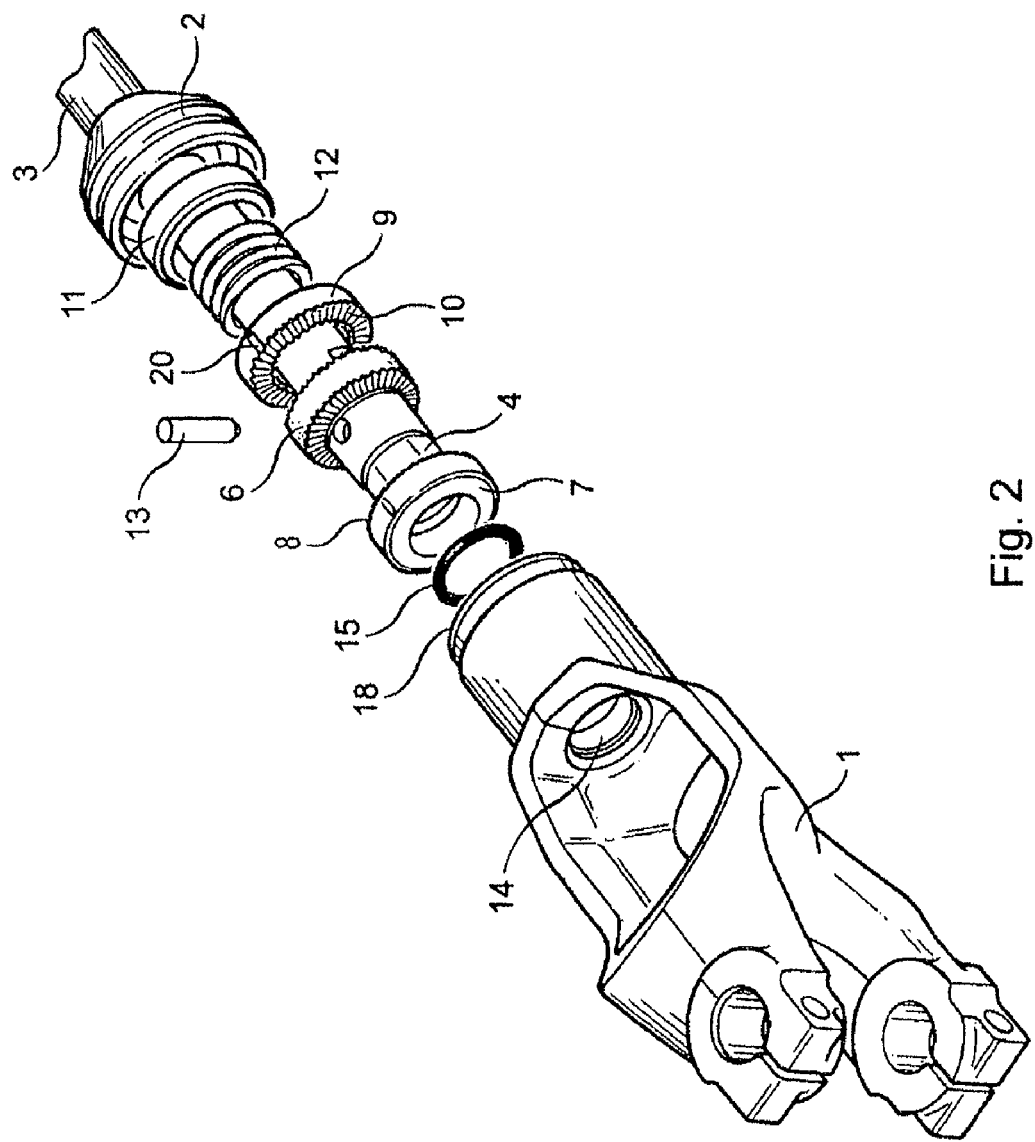
FIG. 2 shows an exploded view of the actuator in FIG. 1.

The precise structure of the actuator can be seen from FIG. 2. The exploded view shows the empty yoke 1 and located above this all the components which together with the spindle 3 are fitted in the yoke 1 via the fitting aperture 18. The sealing ring 15 may be inserted into the passage aperture 14, so that the gap between the readjustment hexagon 4 protruding through the passage aperture 14 and the yoke 1 may be sealed off against dirt and moisture. The first yoke toothed ring 7 comprises a toothing system 8 on its side remote from the yoke 1. This first yoke toothed ring 7 further comprises an aperture, which may be dimensioned so that it can receive the readjustment hexagon 4. The readjustment hexagon 4 may be integrally connected to the spindle toothed ring 6 and may be firmly fixed on the spindle 3 by way of the locking pin 13. In contrast to the yoke toothed ring 7, the spindle toothed ring 6 may be toothed on both sides.

In accordance with at least one embodiment, it may be advantageous if the bilateral toothing system of the spindle toothed ring 6 and the opposing toothing systems of the first yoke toothed ring 7 and the second yoke toothed ring 9 are of symmetrical design. This may enable the tooth flanks running on to one another to be set at the same angle. This measure may serve to ensure that the spindle 3 can be turned manually in both directions, since both a left-hand turn and a right-hand turn similarly cause the toothing systems to be pressed apart.

A compression spring 12, which may be braced against the second yoke toothed ring 9 and directly or indirectly against the yoke 1 itself, may be provided. This spring 12 may serve to keep the toothed rings engaged even when the brake device may be in the rest position. As a result, the toothed rings may already be in engagement even at the start of the braking process. A torque suddenly exerted on the spindle 3 can thus be absorbed immediately. Consequently any turning of the spindle 3 may be reliably prevented also in this phase.

It may be advantageous if a stop sleeve 11 may be provided, the compression spring 12 and the stop sleeve 11 intermeshing with one another. In one embodiment, the stop sleeve 11 may be pushed over the compression spring 12. In another embodiment the compression spring 12 may also be pushed over the stop sleeve 11. In both embodiments, this stop sleeve 11 may produce a precisely defined stop for the second yoke toothed ring 9. In the rest position, the stop sleeve 11 forms a stop clearance 16 with the second yoke toothed ring 9, which may be dimensioned so that the toothing system between the spindle toothed ring 6 and the first yoke toothed ring 7 and the toothing system between the spindle toothed ring 6 and the second yoke toothed ring 9 can disengage together. In this way, the spindle 3 can be deliberately turned to screw it back. If, on the other hand, a tensile load acts on the spindle 3, it can sustain this force only until the stop clearance 16 may be closed and the second yoke toothed ring 9 bears against the stop sleeve 11. In this position, the toothing system of the spindle toothed ring 6 and the toothing system of the second yoke toothed ring 9 will be compressed with corresponding force, so that a turning of the spindle 3 may be no longer possible.

A readjustment hexagon 4 may be advantageously integrally connected to the spindle toothed ring 6. Since both the spindle toothed ring 6 and the readjustment hexagon 4 may be fixedly mounted on the spindle 3, in an integrally formed embodiment of the two components only one locking fastener has to be provided. One simple way of doing this may be to use a locking pin 13, which may be fitted in bores of the combined component comprising the spindle toothed ring 6 and the readjustment hexagon 4, and the spindle 3.

According to disclosed embodiments, the spindle toothed ring 6 and the yoke toothed rings may be located inside the yoke 1. The toothing systems can thereby be protected, in particular, from dirt, which could make it impossible to ensure a reliable positively interlocking connection between the toothed rings. Furthermore, locating the toothed rings inside the yoke affords protection against corrosion. This facilitates maintenance operations and increases the service life of the brake device, or rather extends the maintenance intervals.

The yoke 1 comprises a fitting aperture 18, via which the individual components can be fitted in the yoke 1. A closure cap 2 may be advantageously provided for closing this fitting aperture 18. The closure cap 2 seals off the internal space of the yoke 1 and thereby also forms a barrier against dirt and moisture. The stop sleeve 11 may be braced against this closure cap 2, so that in the event of a tensile load acting on the spindle 3, the position of the second yoke toothed ring may be fixed inside the yoke 1.

A sealing collar 17 may be provided on the closure cap 2. This sealing collar 17 can be designed so that it conforms precisely to the outer circumference of the spindle 3. This means that it may be virtually no longer possible for dirt and moisture to get into the internal space of the yoke 1 via the closure cap 2. In at least one embodiment, however, the sealing collar 17 may be embodied as a corrugated bellows. If this corrugated bellows extends from the closure cap 2 to the adjusting device, not only the internal space of the yoke 1 but also the entire spindle 3 and the gap between the spindle and the adjusting device may be protected.

A passage aperture 14, through which the readjustment hexagon 4 protrudes outwards, may be provided in the yoke 1 opposite the closure cap 2. A sealing ring 15 may be advantageously provided on this passage aperture 14 of the yoke 1. This sealing ring 15 also serves to seal off the side of the yoke 1 opposite the closure cap 2 against the ingress of dirt and moisture.

The toothing systems of the yoke toothed rings are synchronized so that both yoke toothed rings can mesh simultaneously with the spindle toothed ring. This measure obviates the need for the prior existence of either positively interlocking connection, acting between the spindle toothed ring 6 and the first yoke toothed ring 7 or the second yoke toothed ring 9, in the event of a tensile or compressive load acting on the spindle. This also means that a reversal of the load does not entail any turning of the spindle 3. It is, therefore, not possible for an unintended process of adjustment to occur, even in the event of a large number of alternations between tensile and compressive loading of the spindle 3.

In order to reliably safeguard the yoke toothed rings against turning in the yoke 1, grooves 19 are provided in the yoke and loose or fixed springs are provided on the yoke toothed rings. For example, the yoke toothed rings may be provided at their outer circumference with fixed springs, which correspond to corresponding grooves 19 in the internal space of the yoke 1. In another embodiment, however, the springs may also be embodied as loose disk springs 21, corresponding yoke grooves 19 being provided in the internal space of the yoke and disk grooves 20 being provided on the yoke toothed rings. In this embodiment the disk grooves 20 on the yoke toothed rings are formed in the shape of a semicircle and thus matched to the external contour of the disk springs 21. The disk springs 21 are thereby capable of displacement in relation to the yoke 1 only together with the yoke toothed rings.

The second yoke toothed ring 9 may be of identical construction to the first yoke toothed ring 7. It may be merely fitted turned through 180°, so that its toothing system 10 faces the yoke 1. The internal space of the yoke 1 and the two yoke toothed rings 7 and 9 are coordinated with one another so that a rotation of the yoke toothed rings 7 and 9 inside the yoke 1 may be not possible. For example, the yoke toothed rings 7 and 9 may be provided with springs, which correspond to corresponding grooves in the internal space of the yoke 1. In the exemplary embodiment shown here the springs are embodied as loose disk springs 21 (see FIG. 4), corresponding yoke grooves 19 being provided in the internal space of the yoke 1. The disk grooves 20 on the yoke toothed rings 7 and 9 are here in the shape of a semicircle and are matched to the external contour of the disk springs 21.

The compression spring 12 may be pushed on to the spindle 3 adjacent to the second yoke toothed ring 9. In the final fitted state the compression spring 12 may be braced against the closure cap 2 and presses the second yoke toothed ring 9 against the spindle toothed ring 6 and the latter, together with the firmly connected spindle 3, against the first yoke toothed ring 7. The stop sleeve 11 may be pushed over the compression spring 12 and may be likewise braced against the closure cap 2.

Figure 3:
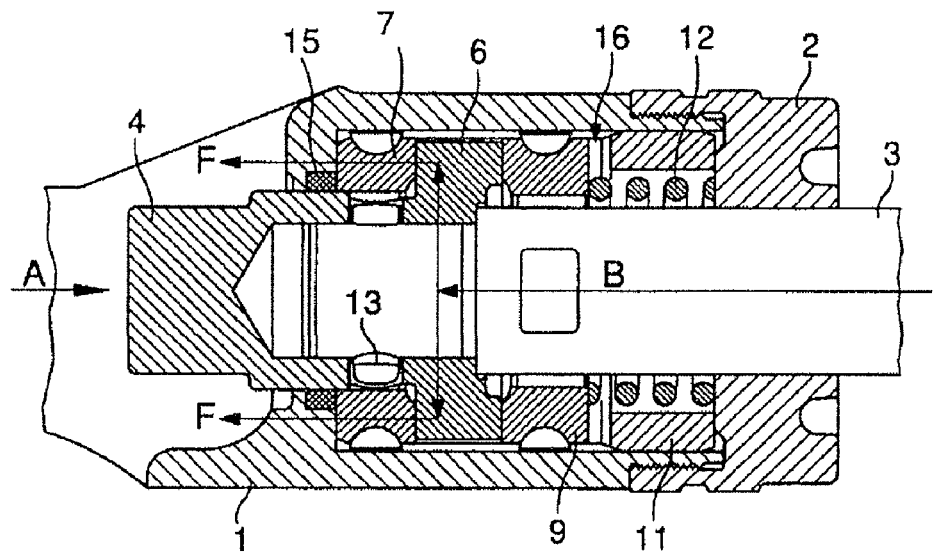
FIG. 3 shows a section through the actuator in the rest position and FIG. 4 shows a section through the actuator under tensile load.

The function of the actuator will be explained with reference to FIGS. 3 and 4. FIG. 3 here shows the actuator during the braking process. In this state a compressive force acts on the spindle 3 in the direction of the arrow B. As soon as the brake blocks then bear on the wheel tires an opposing compressive force acts on the yoke 1 in the direction of the arrow A. The spindle toothed ring 6, which may be fitted on the spindle so that neither a rotation nor an axial displacement relative to the spindle 3 may be possible, may be pressed against the first yoke toothed ring 7, which bears on the yoke 1 in an axial direction and may be rotationally fixed therein. The positively interlocking connection of the two opposing toothing systems of the first yoke toothed ting 7 and the spindle toothed ring 6 therefore prevents a rotation of the spindle 3. A torque acting on the spindle 3 may be in this case introduced into the yoke 1 via the spindle toothed ring 6 and the first yoke toothed ring 7.

The same situation also results when the actuator may be in the rest position. Since the compression spring 12 may be firmly clamped between the closure cap 2, firmly connected to the yoke 1, and the second yoke toothed ring 9, the second yoke toothed ring 9 may be pressed against the spindle toothed ring 6. The yoke 1, on the other hand, may be pressed in the other direction by the compression spring 12 impinging on the closure cap 2. Thus, with the actuator in the rest position, the compression spring 12 also brings the spindle toothed ring 6 and the first yoke toothed ring 7 into engagement.

If, after changing the brake blocks, for example, the spindle 3 may be to be turned back, a corresponding wrench may be applied to the readjustment hexagon 4. A torque acting on the readjustment hexagon 4, causes both the spindle 3 and the spindle toothed ring 6 integrally connected to the readjustment hexagon 4 to turn. In so doing the three toothed rings, in opposition to the force of the compression spring 12, must be pressed so far apart that the toothing systems are freed and the spindle toothed ring 6 can turn in opposition to the two yoke toothed rings 7 and 9. The stop clearance 16 between the second yoke toothed ring 9 and the stop sleeve 11 may be provided for this purpose. This stop clearance 16 may be dimensioned so that the toothing systems are able to disengage.

Figure 4:
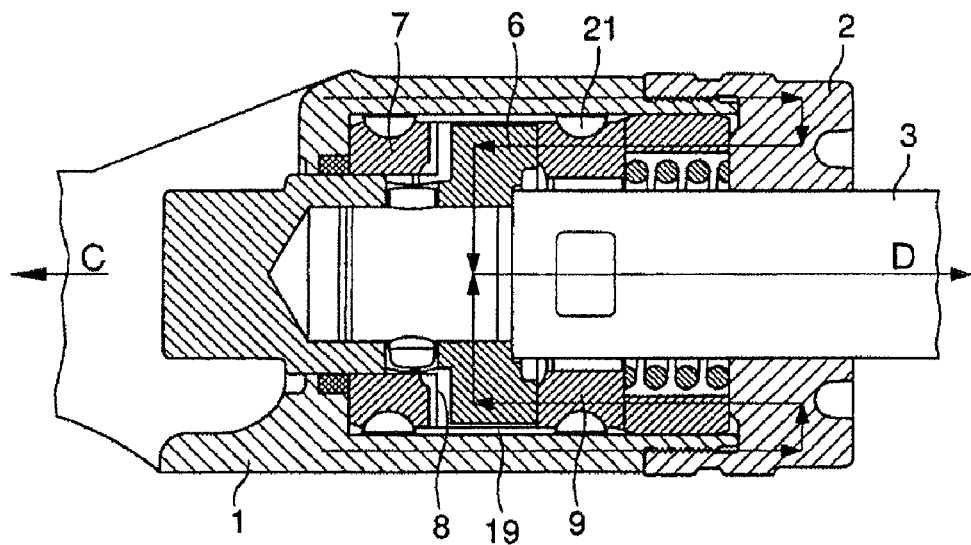

FIG. 4 shows the actuator when a brake block has become frozen tight to the wheel tire, for example, or the suspension shackles for the brake device have seized up due to corrosion. In releasing the parking brake or after the braking process, when the actuator is to be returned to its rest position, a tensile force, which prevents or at least impedes this return movement of the yoke 1 acts on the yoke 1 in the direction of the arrow C. At the same time an opposing tensile force acts on the spindle 3 in the direction of the arrow D. The first yoke toothed ring 7 and the spindle toothed ring 6 are thereby drawn apart. This toothing system may be thereby no longer capable of securing the spindle 3 against rotation.

The spindle toothed ring 6, however, may be still in engagement with the second yoke toothed ring 9, since this is being pressed against the spindle toothed ring 6 by the compression spring 12. Whilst the yoke 1 remains in its position, the spindle 3 moves in the direction of the arrow D until the stop clearance 16 is closed (see FIG. 3). In this position the axially displaceable second yoke toothed ring 9 is clamped between the spindle toothed ring 6 and the stop sleeve 11. In this state shown here the torque acting on the spindle 3 may be transmitted to the yoke 1 via the spindle toothed ring 6 and the second yoke toothed ring 9.

The entire mechanism of the actuator may be accommodated in the internal space of the yoke 1. The sealing ring 15 and the sealing collar 17 prevent dirt and moisture getting in. In this way a long actuator service life may be ensured.

The invention claimed is:

1. A pneumatic brake device having a spindle moveable in an axial direction and a yoke, against which the spindle is braced so that a rotation of the spindle is prevented, the pneumatic brake device comprising:
   a first yoke toothed ring and second yoke toothed ring having opposing toothing systems and being rotationally fixed to the yoke; and
   a spindle toothed ring having a bilateral toothing system that is firmly connected to the spindle between the two yoke toothed rings.

2. The pneumatic brake device of claim 1, wherein the second yoke toothed ring is connected to the yoke in such a way that it is axially displaceable.

3. The pneumatic brake device of claim 2, wherein the bilateral toothing system of the spindle toothed ring and the opposing toothing systems of the first yoke toothed ring and second yoke toothed ring are of symmetrical design.

4. The pneumatic brake device of claim 3, further comprising a compression spring, which is braced against the second yoke toothed ring and directly or indirectly against the yoke itself.

5. The pneumatic brake device of claim 4, further comprising a stop sleeve wherein the stop sleeve and the compression spring intermesh with one another.

6. The pneumatic brake device of claim 1, further comprising a readjustment hexagon integrally connected to the spindle toothed ring.

7. The pneumatic brake device of claim 1, wherein the spindle toothed ring and the yoke toothed rings are located inside the yoke.

8. The pneumatic brake device of claim 7, further comprising a closure cap configured to close a fitting aperture of the yoke.

9. The pneumatic brake device of claim 8, further comprising a sealing collar on the closure cap.

10. The pneumatic brake device of claim 7, further comprising a sealing ring provided on a passage aperture of the yoke.

11. The pneumatic brake device of claim 1, wherein the toothing systems of the yoke toothed rings are synchronized so that both yoke toothed rings can be made to mesh simultaneously with the spindle toothed ring.

12. The pneumatic brake device of claim 1, wherein grooves are provided in the internal space of the yoke and loose springs or fixed springs are provided on the yoke toothed rings.

* * * * *